(No Model.)
A. WEMPLE.
SEPARATOR.
No. 380,839. Patented Apr. 10, 1888.
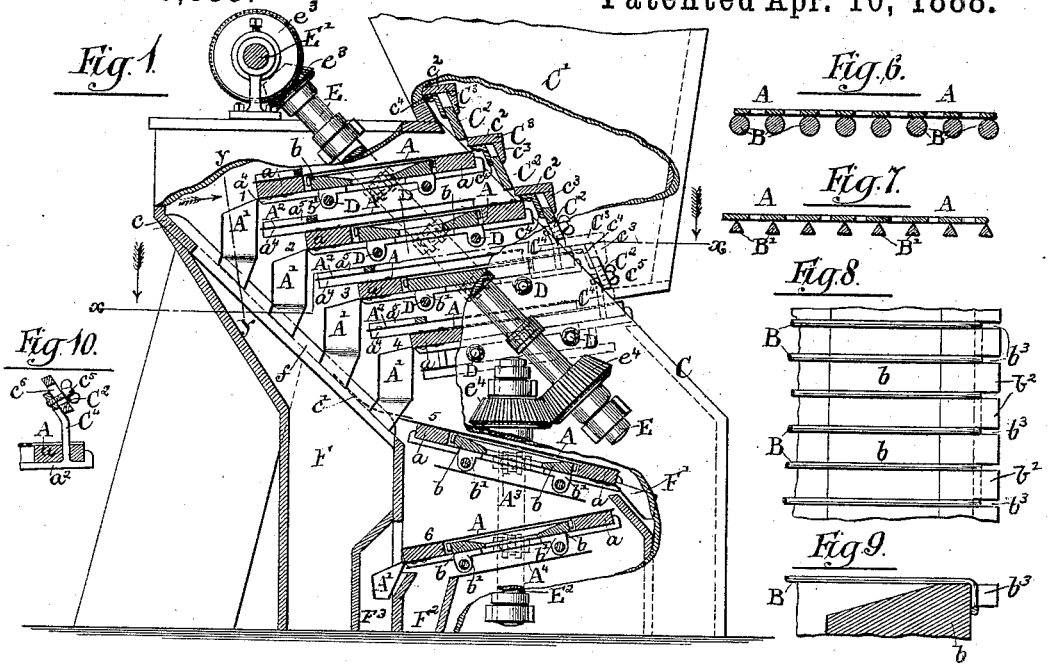
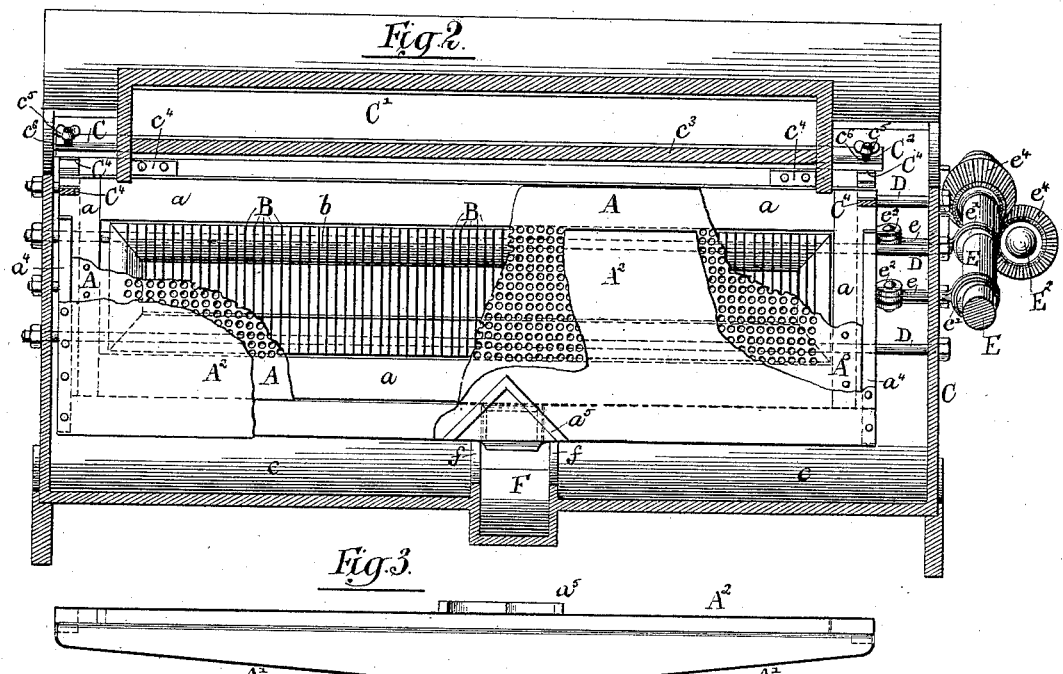
Witnesses:
Louis M. F. Whitehead
C. C. Poole
Inventor:
Andrew Wemple
by M. E. Dayton
Attorney

UNITED STATES PATENT OFFICE.

ANDREW WEMPLE, OF CHICAGO, ILLINOIS, ASSIGNOR OF ONE-HALF TO LOUIS GATHMANN, OF SAME PLACE.

SEPARATOR.

SPECIFICATION forming part of Letters Patent No. 380,839, dated April 10, 1888.

Application filed December 3, 1884. Renewed March 3, 1887. Serial No. 229,610. (No model.)

*To all whom it may concern:*

Be it known that I, ANDREW WEMPLE, of Chicago, in the county of Cook and State of Illinois, have invented certain new and useful Improvements in Separators; and I do hereby declare that the following is a full, clear, and exact description thereof, reference being had to the accompanying drawings, and to the letters and figures of reference marked thereon, which form a part of this specification.

The object of this invention is to provide an improved method of and means for effecting the separation of granulated material in such manner that particles of different sizes or shapes may be separated from each other—as, for instance, for separating one kind of grain from another, cockles from wheat, or broken rice from the entire grain.

In carrying out the novel process or method of forming part of my invention I employ, in connection with a reciprocating screen or sieve, a series of stationary bars, ribs, or wires located below and adjacent to the under surface thereof, and preferably as closely thereto as is possible without actual contact therewith. Said sieve or screen is reciprocated in such manner that the said wires or bars are intermittently brought into opposition to the sieve-openings and at such speed as to leave the sieve-openings free a sufficient time for the passage of short or round particles through the said openings, but not a sufficient time to permit the passage of larger or longer particles, which will be stopped and forced upwardly or backwardly by the constantly-succeeding presence of the bars, ribs, or wires below the said openings.

In the operation of the device constructed as above described it is obvious that the finer or smaller and more nearly round or spherical particles in the material being operated upon will pass through the sieve, while the larger and longer particles will remain upon the surface thereof, and may be tailed off in the usual manner, so that a practical separation of the particles of the different kinds mentioned may be accomplished. The size of the apertures of said sieve is graded with reference to the size of the grain or other material and of the impurities or particles to be sifted from it. Thus, for example, when wheat is to be separated from oats, the sieve will be provided with meshes or openings of such dimensions as shall permit the free passage of the wheat, irrespective of the position in which the grains thereof are presented to the openings, but will prevent the oats, which are longer than the wheat, from passing crosswise through the said meshes or openings. Again, where cockles are to be separated from wheat, the meshes or openings will be made of sufficient size to permit the free passage of the cockles, but of less size than the length of the grains of wheat, so that when the latter are presented sidewise to the openings or meshes their passage through them will be prevented. The meshes or openings may be made circular, square, or of other shape; but they are preferably made circular, so that the passage through them will be prevented of all particles which are longer in one direction than the diameter of the openings when such particles are presented sidewise to the openings, or in such manner as to lie across the same. The bars, ribs, or wires are preferably located at the same distance apart as the apertures of the sieve or screen, so that each row of the screen-apertures will be opposed by a single wire, and the screen is vibrated through a distance sufficient to carry the wires alternately into position to close the apertures and to fully open them. The ribs, bars, or wires may, however, be arranged otherwise than as above described, and the vibratory motion mentioned may be sufficient to carry the wires entirely over the apertures, or alternately over two apertures, or otherwise; but the construction set forth is for several reasons preferred. The same result as above set forth may obviously be obtained either by giving a vibratory motion to the wires or bars or to the screen. As herein shown, the wires or bars are stationary and the screen is vibrated, this being the preferred construction, inasmuch as the same vibrating motion serves to give the required shake to the sieve to cause the necessary agitation of the material upon it. The bars, ribs, or wires are preferably made of rounded form upon their sides adjacent to the screen, so as to prevent the lower ends of the longer particles, which may at intervals pass through and extend below the sieve, from being caught and held between the wires or bars and the edges of the perforations in the sieve, it being seen that during the shaking motion of the sieve a rounded bar or wire opposed to and approaching the edge of a sieve-opening will present an inclined surface calculated to force upward such particles as may have been previously projected downward and into said opening.

The drawings illustrate a practical and efficient way in which the several parts mentioned can be arranged, and show a series of sieves in conjunction with bars or wires arranged to constitute an apparatus for separating different kinds of grain, or for separating cockles or other impurities from grain, as may be desired.

In the accompanying drawings, Figure 1 is a side elevation, partially in section, of an apparatus illustrating my invention. Fig. 2 is a plan section taken upon line $x\,x$ of Fig. 1. Fig. 3 is a detail section taken upon line $y\,y$ of Fig. 1. Fig. 4 is a detail section, upon an enlarged scale, taken longitudinally through one of the screens shown in Fig. 1. Fig. 5 is an enlarged detail section of one of the screens, taken upon line $x\,x$ of Fig. 4. Fig. 6 is a section, much enlarged, of a part of one of the screens and the wires or bars below it. Fig. 7 is a similar section showing bars of triangular shape. Figs. 8 and 9 are detail views of the frame supporting the wires beneath the screens, showing a preferred means of attaching said wires thereto. Fig. 10 is a detail view illustrating the means adjustably connecting the gates of the hopper with the screen-frames.

As illustrated in the drawings, the screen is shown in the form of a perforated sheet, A, which is secured to a rectangular screen-frame, $a$, and B B are a series of wires or rods or ribs which are located below and adjacent to the under surface of the screens A. The wires may be placed in contact with the screen; but, as is preferable, are arranged as close thereto as is possible without actual contact, in order to prevent resistance in the motion of the screen, which would otherwise be due to the frictional contact of the wires therewith.

The bars or wires B may be supported or sustained by any means calculated to retain them in permanent relation one with the other—as, for instance, they may be supported throughout their length, or at intervals, from below by supporting devices disposed so as to allow the free passage of the material through them and away from the screen; or they may be held at their ends in or attached to a suitable frame, so as to form a grating or screen. The last-mentioned construction is illustrated in the drawings, in which the wires B are shown as supported upon or stretched across a rectangular frame, $b$, provided with suitable holding devices for securing the wires thereto, as will be hereinafter described.

In the apparatus illustrated in the drawings a series of screens, (indicated in Fig. 1 by the numerals 1 to 4,) constructed substantially as above set forth, are arranged one above another in a suitable housing, C, and are fed from a common hopper, C', located at one side of the housing. In the lower part of the housing are located two additional or auxiliary screens (designated by the numerals 5 and 6) arranged to receive the material which has passed through the several screens of the upper series, and to subject the said material to a second and third separation to remove any larger particles that may have passed through the said upper screens. The screens are preferably supported and arranged to slide upon horizontal guide-rods D, supported at their ends in the side walls of the casing C and passing through depending lugs or eyes $a'$, Fig. 4, upon the screen-frames. The frames $b$ are in the particular construction herein shown also supported upon the rods D, and are conveniently secured thereon by clamps or eyes $b'$, the said frames preferably being located within the screen-frames and made shorter than the said screen-frames, so as to permit the required longitudinal movement of the latter.

The several screens in the apparatus shown are preferably made much narrower from their receiving to their discharge side than in the opposite direction, it having been found that a required sifting action may be obtained in a screen of this character by passing the material over a relatively-short screen surface. I have ascertained by experiment, also, that the most effective action is obtained by feeding the material in relatively-small quantities to the screen, so that it will be spread in a thin layer over the surface thereof, and the screens are made of the shape shown in order to obtain the required capacity in the screens when fed in the manner described, the hopper C' and the discharge-openings thereof being made of the same length as the perforated part of the screens for the same reason. The screens will be set at an inclination determined by experiment and depending upon the width of the screen, the character of the material being operated upon, and the speed of the reciprocatory movement of the screens. The inclination shown is one that I have found will give satisfactory results in a machine of the general proportions shown; but in carrying out the invention the screens may be placed at any angle found desirable. If the screens are arranged at too great an inclination, the material may pass over them too rapidly and a part of the finer or spherical material be carried over with the larger particles, while if too nearly horizontal the larger or longer material may remain upon the surface thereof too long, or after all of the approximately spherical particles have been separated therefrom, thereby giving opportunity for some of the long particles to find their way through the openings and past the wires below them that would not otherwise do so.

The necessary vibratory or shaking action of the screens is conveniently derived from an inclined rotary shaft, E, mounted in suitable bearings upon one of the vertical sides of the machine-housing, and driven by any suitable gearing—as, for example, by means of bevel-gears $e^3$ from a horizontal driving-shaft, E', mounted upon the top of the housing, as herein shown. Motion is transmitted from the said shaft to the screen, preferably by means of straps $e$, passing around eccentrics $e'$ on the shaft and pivoted to eyes $e^2$, secured to the screen-frames at their ends nearest the rotary shaft. Said eyes $e^2$ are, as herein shown, cast upon cross-bars $a^2$, upon which the lugs $a'$ are also formed, and to which the ends of the frames $a$ are secured.

Each screen carries at its lower or tail end a trough, A', which depends from the end of the screen and into which the material that fails to pass through the screen-openings is discharged. To afford working-space for these troughs, which are carried by and with the shaking screens, the screens are successively set back from one another at their tail ends, commencing with the top screen of the series, numbered from 1 to 4, as clearly shown in Fig. 1. The said troughs extend from one side to the other of the screens, as clearly shown in Fig. 3, in order to collect the material passing from the entire surface thereof, and the bottoms thereof are inclined downwardly toward the middle of the screen, and are provided with spouts $a^3$, through which the material is discharged from the troughs. These spouts are arranged to discharge into a common central spout or passage, F, connecting with an opening formed through the under or lower inclined side, $c$, of the casing.

In order to catch the siftings from one screen and direct the same to the incline, so as to prevent the siftings from falling on the next lower screen of the series, an inclined board or table, A², is located below each of said screens, said tables, as herein shown and preferably constructed, being supported upon the screens, whereby said tables will partake of the vibratory movement of the screens, and the material falling thereon will be caused to move toward the tail ends of the screens and fall to the inclined surface $c$. As a preferred means of supporting the tables A², narrow parallel strips $a^4$ are attached along the ends of the screen-frames, as indicated in Figs. 1 and 2, to which strips said tables are secured at their end margins, portions of the tables A² being shown as broken away in Fig. 2 in order to more fully illustrate the construction of the parts. The inclined tables A² extend at their lower ends over and somewhat beyond the troughs A', so as to prevent the grain discharged from the tables from passing into said troughs.

As a means for diverting the grain passing along the tables from points at the middle of each lower end of a table and thereby preventing the grain discharged from the tables from falling into the passage F, each table A² is provided at the middle of its lower end with two inclined guides, $a^5$, Fig. 2, arranged to deflect the grain to both sides of the said passage; and to prevent the material discharged from the incline $c$ from entering the passage F, the side walls of said passage are extended above the said incline at each side of the opening through the incline, as indicated at $f$.

The screen numbered 5 is inclined reversely to the inclination of the upper screens, and is located in position to receive the material passing from the incline $c$, an inclined metal guide-plate, $c'$, being located at the lower end of the incline $c$, as indicated in dotted lines in Fig. 1, and adapted to direct the material from the said incline to the head of the screen 5.

The coarser or longer particles which fail to pass through the screen 5 will pass over the tail of said screen into a passage, F', which is properly arranged to receive them. The siftings from the screen 5 will fall directly upon an inclined board, A³, arranged below the said screen in position to catch the siftings from the said screen 5 and discharge the same upon the upper end of the lowest screen, 6, which latter is, as shown, inclined in a reverse direction to the screen 5 above it. The incline A³ can be either suspended from screen 5, so as to move therewith, or it can be connected in any suitable way with the frame of screen 5 under the latter, or within the walls of the casing of the apparatus. In like manner an incline, A⁴, is arranged below the screen 6 in position to discharge the siftings from said screen into a passage, F². This incline A⁴ can be suspended from the screen 6, or it can be permanently secured to the casing C. The lowest screen, 6, tails off into a passage, F³, arranged, as shown, adjacent to the passage F, so that the larger and longer particles that have passed through the upper screens and are tailed off from the said screen 6 may be spouted off with the similar material passing from the said passage F. The screens 5 and 6 may be reciprocated by connecting devices similar to those before described in connection with the upper series of screens, from a vertical shaft, E², driven by means of intermeshing gears $e^4$ from the shaft E', or otherwise, as desired.

From the foregoing it will be readily understood that where, for example, a separation between oats and wheat is to be effected the mixed oats and wheat are fed into a series of shaking screens—such as the screens 1 2 3 4—from which screens the oats will be tailed off into the passage F, while the wheat passing through the screens will be caught by the tables A², and from thence discharged onto incline $c$, from whence the wheat passes to screen 5, to screen 6, and from thence to passage F², while any oats remaining with the grain discharged on the incline $c$ will be separated and tailed off by one or the other of the two lower screens, 5 and 6. In the same way when the screens are adapted for separating cockles from wheat the wheat will in such case be tailed off into passage F, with possibly some of the wheat into passage F', while the cockles passing through the screen will be finally discharged into the passage F².

As a preferred construction in the frames $b$ and means for attaching the wires B to the said frames, the latter are formed of metal and are provided with flanges $b^2$, (shown in Figs. 2, 8, and 9,) said flanges having notches $b^3$ formed in them, whereby the wires may be quickly and conveniently attached to the frame by passing them through the notches and around the projections formed thereby alternately at opposite sides of the frame in an obvious manner. Other ways of securing the wires to the frame may obviously be adopted in practice.

In Fig. 6 the wires or rods B are shown as made larger than in the other figures, the space between the two adjacent wires being the same or only slightly greater than the diameter of the screen openings, this construction being a desirable one, inasmuch as by it the amount of travel in the screen requisite to alternately open and close the screen-openings is reduced to a minimum. It may be remarked that it is found desirable to vibrate the screen through as short a distance as possible, so as not to produce a violent agitation of the particles thereon, which may cause any of the long grains to assume a vertical position calculated to favor their passage lengthwise through the screen-openings, but to give a gentle shaking movement adapted to cause the particles, which are preferably, as before stated, distributed in a thin layer over the screen, to move or roll gradually down toward the lower end of the screen, while at the same time retaining a horizontal position thereon.

In Fig. 7 the triangular bars B' are shown in place of the cylindric bars or wires illustrated in the other figures, one edge of the bar being placed upwardly, so that the inclined faces are brought into contact with the long particles entering the screen-openings in the movement of the screen, with advantageous results in forcing said particles upwardly or outwardly.

When relatively large wires or rods B or B' are used, as shown in Figs. 6 and 7, the ends thereof may be clamped or otherwise suitably held at their ends in the sides of the frame $b$.

As a preferred means of constructing the gates $C^2$ and the parts of the hopper and housing adjacent thereto and of operating the said gates, the parts mentioned are made as follows: The side of the housing adjacent to the upper ends of the screens, between the gates $C^2$, is formed by means of a series of angle-bars, $C^3$, which are secured at their ends to the side walls of the hopper at the proper distance apart to form the exit-openings of the said hopper. The said angle-bars are arranged with their salient angles outwardly, so as to form approximately horizontal parts or plates $c^2$, extending inwardly over the upper ends of the screens, and depending portions $c^3$, between which and parallel inner flanges, $c^4$, secured to the under surfaces of the plates $c^2$, the gates $C^2$ are adapted to slide. The openings between the gates and the angle-bars for the exit of material from the hopper are formed between the lower edges of the gates and the inner edges of the parts $c^2$ of the angle-bars, so that material passing through said openings will fall upon the screens, the upper ends of which are extended beneath the parts $c^2$ of the angle-bars, as before mentioned.

The gates $C^2$ are extended at their ends through the side walls of the hopper, and are adjustably supported at the outside of said hopper in such manner that they may be adjusted vertically to give a greater or less space between their lower edges and the opposing edges of the angle-bars, and to thereby give a required amount of feed. For the purpose mentioned the said gates may be adjustably attached to suitable stationary supports or parts of the housing by any suitable attaching device; but, as herein shown, they are otherwise supported in a manner and for a purpose hereinafter described.

In order to secure a continuous and even feed of the material from the hopper to the screens, means are herein provided for reciprocating the gates $C^2$ in a longitudinal direction continuously during the operation of the apparatus, the purpose of moving the gate longitudinally being to suitably agitate the material in contact therewith without changing the areas of the exit-openings. As a convenient means of effecting this reciprocatory movement of the gates, each of said gates is connected at its ends with the shaking screen below it in such manner that the longitudinal movement of the screen is transmitted to the gate. For this purpose the screen-frames, as shown in the drawings, are provided with arms or projections $C^4$, (more clearly shown in Fig. 10,) which extend upwardly through the housing C, and are attached to the ends of the gates. The said arms $C^4$ may be attached to the screen-frames in any desired manner, but, as shown in the drawings, are formed upon the castings $a^2$, which are secured to the ends of the screen-frames proper. In order to provide for the vertical adjustment of the gates $C^2$, for the purpose before stated, the said gates may be attached to the arms $C^4$ by adjusting devices, herein shown in the form of set-screws $c^5$, inserted through vertical slots $c^6$ in the ends of the gates and into the said arms.

I am aware that a series of vibrating bars or wires have been placed below a screen for the purpose of preventing the screen from becoming clogged, as is shown, for instance, in the patent to W. M. Redd and E. M. Sanford, dated May 14, 1878, No. 203,648. I am also aware that it has been proposed to locate a series of stationary bars below a shaking screen, in order to throw back upon the screen any grains of wheat which may become lodged in the apertures of the screen, as is shown, for instance, in a patent granted to C. E. McNeal, dated June 17, 1884, and numbered 300,621.

The device last referred to differs in construction from that herein shown by having the bars located at a sufficient distance below the screen to always leave spaces of a sufficient size to permit the passage of cockle or similar particles of grain, so that the screen-apertures are at no time closed and the bars operate upon the grains only which become lodged in the said screen-apertures. Objections to this construction are that the said bars, being located at a sufficient distance below the screen to permit the passage at all times of the smaller material, obviously will not be adapted to lift or throw upwardly the larger grains entering the apertures to a sufficient extent to cause their release from said apertures.

As it relates to the feature of construction in the screen and the vibrating bars below it, my invention differs from the devices above described in having a series of bars located practically in contact with the screen and in position to alternately open and close the screen-apertures in the operation of the device, the screen being reciprocated at such speed that the screen-apertures remain open a sufficiently long time to permit the passage through them of relatively short or smaller particles of material, but not a sufficient length of time to permit the passage of longer particles. In carrying out this part of my invention it is obviously not essential that the particular construction herein shown, either in the screen, the bars, or wires, or the devices for supporting them, should be used. The upper screen may, for instance, be made of woven wire instead of sheet metal; but the use of the latter, for reasons before stated, is preferred. I do not desire, therefore, to limit my invention to the particular devices herein shown as illustrating one way in which it may be carried out in practice, and I consider all devices embodying the same principles of construction and operation herein set forth to be covered by the broad claim or claims hereto appended.

In the first claim the screen is set forth as being movable and the wires or bars as stationary; but this claim is intended to cover the alternative and equivalent construction in which the wires or bars are actuated so as to move them relatively to the screen, whether the screen is also moved or shaken or not.

I claim as my invention—

1. The method of separating round or short from long particles, which consists in passing the mixed particles through a reciprocating screen which is moved over stationary bars or wires adjacent to its lower surface at such rate of speed as to leave the screen-apertures open a sufficient time to permit the passage of short or round particles, but to prevent the passage of particles which are long relatively to their diameter, substantially as set forth.

2. The combination, with a suitable frame or housing provided with supporting bars or rods, of a screen mounted to slide upon the said rods, a frame supported by the rods and provided with a series of bars or wires located below and adjacent to the screen, and means, substantially as described, for reciprocating the said screen, substantially as set forth.

3. The combination, with a series of shaking screens placed one above another, and a series of stationary wires or bars located below and adjacent to each of the said screens, of a series of troughs attached to said screens, a series of tables for receiving the material passing through the several screens, located below and attached to the latter, an incline, $c$, adapted to receive the material from the several tables, a passage for receiving the material from the several troughs, and an auxiliary screen located in position to receive the material passing from the incline $c$, substantially as and for the purpose set forth.

4. The combination, with a series of shaking screens, of a series of troughs attached to the said screens and provided with central discharge-spouts, a series of receiving-tables attached to the screens, an incline, $c$, adapted to receive the material from the several tables, a central passage, F, adapted to receive the material from the said troughs, and guides or deflectors, as $a^5$, adapted to prevent the entrance to the passage F of the material passing from the said tables, substantially as and for the purpose set forth.

5. The combination, with a series of reciprocating screens and a series of stationary wires or bars located below and adjacent to each of said screens, and a common hopper for supplying the several screens, of a series of inclined partitions or tables located between the screens for receiving the material passed through the latter, an incline, $c$, arranged to receive the material from the several tables, a series of troughs attached to the screens for receiving the tailings from the latter, a passage adapted to receive the material from the several troughs, and one or more auxiliary screens located in position to receive the material from the incline $c$, and each provided with a series of wires or bars located below and adjacent to it and adapted to receive the material from the said incline $c$, substantially as and for the purpose set forth.

6. The combination, with a hopper provided with an exit-opening, of a longitudinally-movable gate placed over the opening and arranged to form part of the wall of the hopper, a reciprocating screen receiving material from the hopper, and means connecting the gate with the screen constructed to permit vertical adjustment of the gate, substantially as described.

In testimony that I claim the foregoing as my invention I affix my signature in presence of two witnesses.

ANDREW WEMPLE.

Witnesses:
DAVID F. COLVILLE,
OLIVER E. PAGIN.